United States Patent
Howard et al.

(10) Patent No.: US 7,496,957 B2
(45) Date of Patent: Feb. 24, 2009

(54) SYSTEM AND METHOD FOR PREVENTING USE OF A WIRELESS DEVICE

(75) Inventors: Tom Howard, Fort Collins, CO (US); Tim Goldstein, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1716 days.

(21) Appl. No.: 10/037,267

(22) Filed: Jan. 2, 2002

(65) Prior Publication Data
US 2003/0126462 A1    Jul. 3, 2003

(51) Int. Cl.
G06F 9/00 (2006.01)
G06F 15/16 (2006.01)
G06F 17/00 (2006.01)

(52) U.S. Cl. ...................................................... 726/14
(58) Field of Classification Search ................. 713/200, 713/151; 726/14
See application file for complete search history.

(56) References Cited

U.S. PATENT DOCUMENTS

| | | | | |
|---|---|---|---|---|
| 5,581,594 A * | 12/1996 | McAfee | | 340/7.1 |
| 5,732,268 A * | 3/1998 | Bizzarri | | 713/2 |
| 5,987,609 A * | 11/1999 | Hasebe | | 713/200 |
| 6,070,054 A * | 5/2000 | Foladare et al. | | 340/7.21 |
| 6,181,928 B1 * | 1/2001 | Moon | | 455/415 |
| 6,212,375 B1 * | 4/2001 | Alanara | | 455/423 |
| 6,289,214 B1 * | 9/2001 | Backstrom | | 455/422.1 |
| 6,401,208 B2 * | 6/2002 | Davis et al. | | 713/193 |
| 2001/0016907 A1 * | 8/2001 | Kang et al. | | 713/152 |
| 2001/0045884 A1 * | 11/2001 | Barrus et al. | | 340/7.2 |
| 2002/0004905 A1 * | 1/2002 | Davis et al. | | 713/193 |
| 2002/0166072 A1 * | 11/2002 | Cromer et al. | | 713/202 |

FOREIGN PATENT DOCUMENTS

WO    WO 00/45243       8/2000
WO    WO0045243 B2 *    8/2000

OTHER PUBLICATIONS

United Kingdom Search Report for Application No. GB 02258128.4 dated Nov. 25, 2003.

* cited by examiner

*Primary Examiner*—Kambiz Zand
*Assistant Examiner*—Jason K Gee

(57) ABSTRACT

In one embodiment, the present invention is directed to a processor-based device that prevents unauthorized use, comprising a processor for executing software instructions, software instructions defining at least one user application, a wireless communication subsystem that is operable to transmit and receive data utilizing a wireless protocol, and software instructions defining a security protocol process that is operable to prevent execution of the software instructions defining the at least one user application by the processor when a message is received via the wireless communication subsystem, wherein the message indicates that the processor-based device is not in possession of a rightful user.

17 Claims, 2 Drawing Sheets

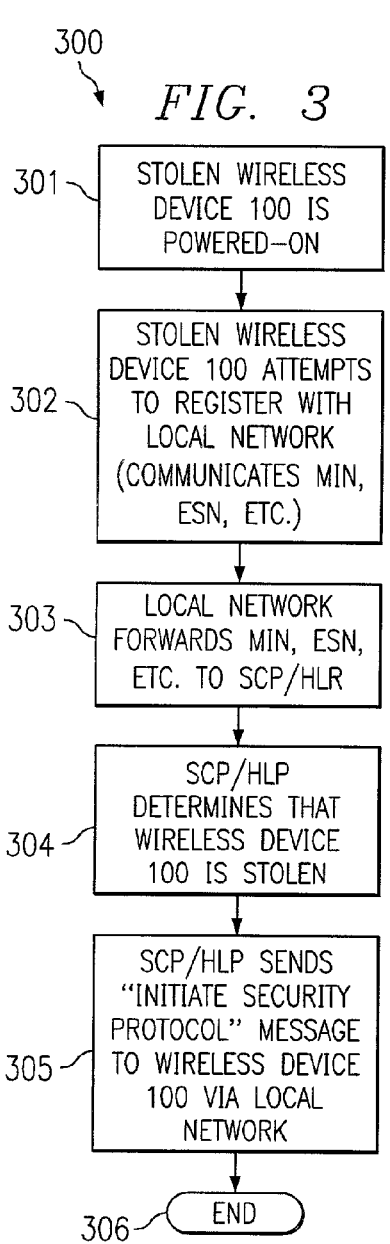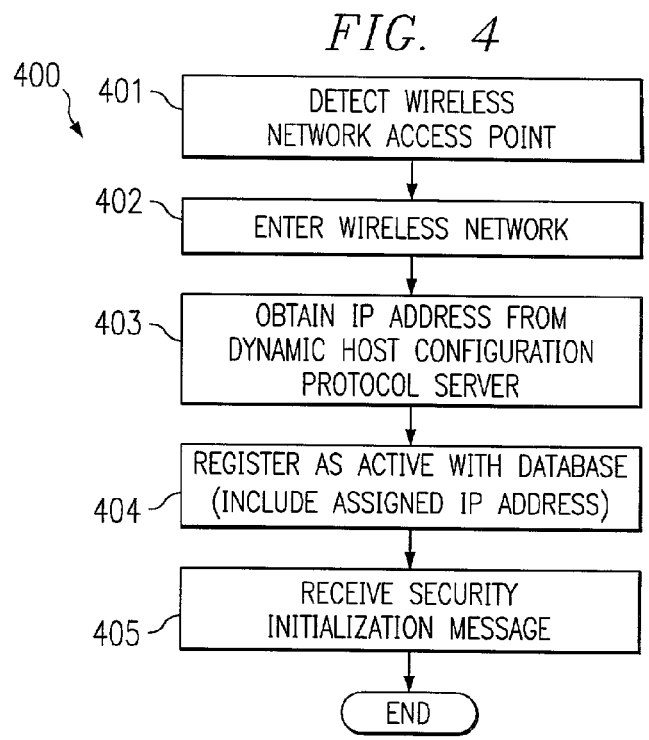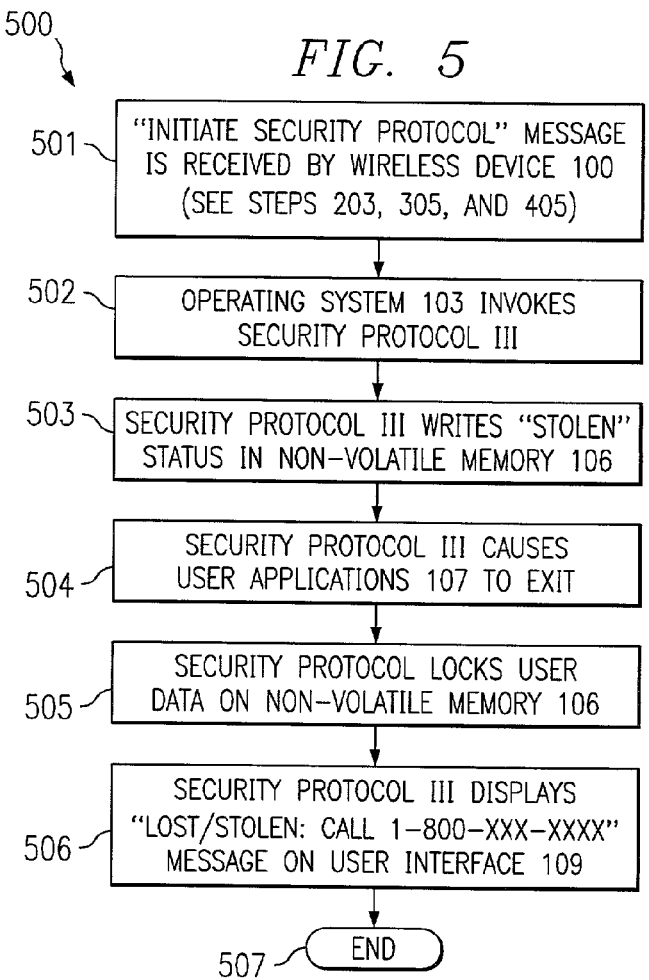

SYSTEM AND METHOD FOR PREVENTING USE OF A WIRELESS DEVICE

TECHNICAL FIELD

The present invention is related to wireless communications and more particularly to a system and method for preventing use of a wireless device.

BACKGROUND OF THE INVENTION

Cellular telephony products have been distributed to consumers in substantial numbers. The most common cellular telephony products are cellular telephones. In the United States, two cellular telephony standards are typically utilized to define the operations of cellular telephones. First, a time division multiplexing/time division multiple access (TDM/TDMA) cellular standard is defined by Telecommunications Industry Association/Electronics Industries Alliance (TIA/EIA) standards IS-41 and IS-136. Second, a code division multiple access (CDMA) cellular standard is defined by the TIA/EIA standard IS-95. Both standards define various physical layer requirements and public interface protocols to allow cellular subscribers to access the respective cellular networks.

Cellular telephones (both TDM/TDMA- and CDMA-compliant telephones) are assigned a respective Electronic Serial Number (ESN) and a Mobile Identification Number (MIN). The ESN is a unique 32-bit serial number used to uniquely identify a cellular telephone. The MIN may be the cellular telephone's phone number.

Since cellular networks allow subscribers to access the network from practically any location, cellular networks employ various security algorithms to prevent unauthorized cellular network use. Specifically, cellular networks utilize service control points (SCPs) to implement the security algorithms. An SCP is a remote database within a Signaling System 7 (SS7) network. SCPs are typically used in many cellular systems to implement home location registry (HLR) functionality. The HLR functionality maintains a database record for each cellular device to control interaction with the cellular network. The database records may indicate whether cellular devices are permitted to access a network. The database records may also indicate whether cellular devices are currently active within a network and may identify the respective locations of cellular devices within a network to facilitate routing of data to cellular devices.

When a cellular telephone attempts to access a cellular network to, for example, register in the network to receive calls, the cellular telephone transmits the ESN and the MIN to the local telephony switch. The local telephony switch utilizes the MIN to determine the cellular provider associated with the cellular telephone. The local switch then transmits the ESN by SS7 messaging to the cellular provider that maintains the respective HLR. The SCP determines from the ESN whether the cellular telephone is a valid device. If it is, the SCP transmits an appropriate message to the local switch and the local switch allows access to the cellular network. If the device is not valid, the SCP transmits an appropriate message to the local switch and the local switch denies access to the cellular network.

When a cellular device is stolen, the owner of the cellular device may contact a customer service representative or an automated system of the cellular provider. The owner may provide the MIN of the stolen device. The cellular provider will update its records in its HLR to indicate that the device associated with the corresponding ESN is not valid. Accordingly, any individual who attempts to utilize the cellular telephone will not be allowed to access any cellular network, although the stolen device remains operational. By utilizing the security protocols of cellular networks, the incentive to steal cellular telephones is significantly reduced.

However, this approach is problematic for other wireless devices. Specifically, a cellular telephone has essentially no other purpose other than accessing a cellular network. However, many commercially-available wireless and cellular devices perform a variety of functions. For example, wireless personal data assistants (PDAs), such as the Hewlett-Packard Company's Jornada 560 PDA, are capable of executing a variety of business, multimedia, and entertainment applications in addition to being able to perform wireless communications. If the security protocols of traditional cellular telephones were applied to wireless PDAs, an individual that has stolen a wireless PDA could not use the PDA for wireless communication. However, the individual could use the PDA to execute a large variety of other software applications.

Additionally, various security algorithms have been applied to protect stolen personal computers from unauthorized use. For example, many personal computers require a password to utilize various user applications. The password may be required from a boot-up script. Alternatively, the password may be required from a "screen-saver" process that is initiated when a user fails to enter data for a given period of time. However, both of these password requirements are generally ineffective. First, most users find password requirements cumbersome and intentionally disengage these features. Additionally, the password requirements may be overcome by booting a personal computer utilizing a system disk (e.g., a floppy disk) that does not invoke the password script or by resetting the personal computer depending upon how the password functionality is implemented.

BRIEF SUMMARY OF THE INVENTION

In one embodiment, the present invention is directed to a processor-based device that prevents unauthorized use, comprising a processor for executing software instructions, software instructions defining at least one user application, a wireless communication subsystem that is operable to transmit and receive data utilizing a wireless protocol, and software instructions defining a security protocol process that is operable to prevent execution of the software instructions defining the at least one user application by the processor when a message is received via the wireless communication subsystem, wherein the message indicates that the processor-based device is not in possession of a rightful user.

BRIEF DESCRIPTION OF THE DRAWINGS

FIG. 3 depicts another exemplary flowchart of steps that initiate a security protocol according to embodiments of the present invention.

FIG. 4 depicts another exemplary flowchart of steps that initiate a security protocol according to embodiments of the present invention.

FIG. 5 depicts an exemplary flowchart of steps that perform a security protocol to prevent unauthorized access to a wireless device according to embodiments of the present invention.

DETAILED DESCRIPTION OF THE INVENTION

Figure 1:
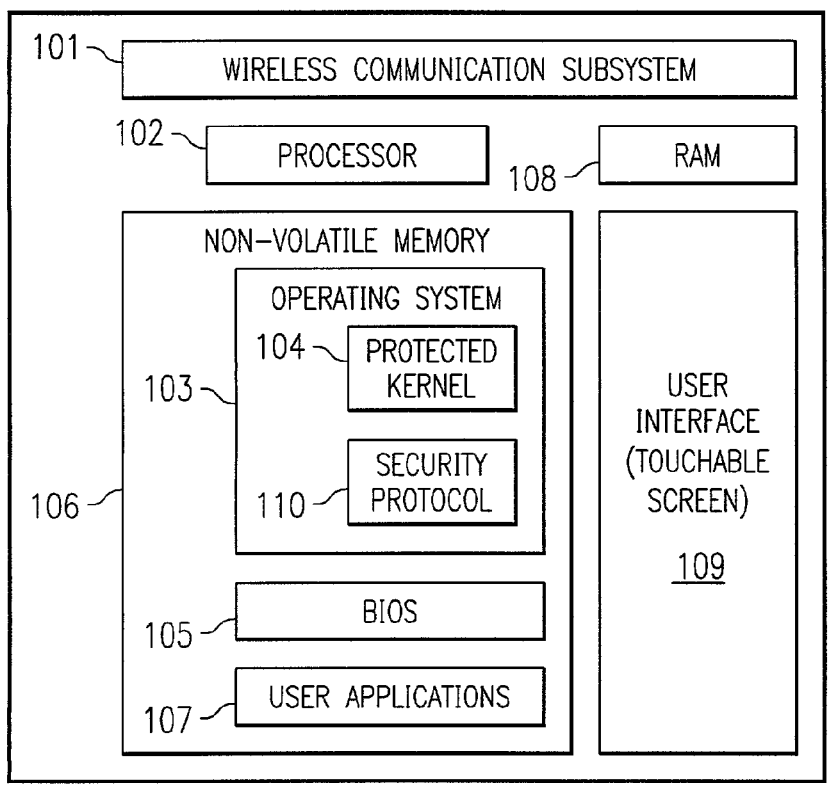
FIG. 1 depicts a block diagram of an exemplary wireless device that may implement embodiments of the present invention.

FIG. 1 depicts exemplary wireless device 100 that may implement embodiments of the present invention. Wireless device 100 preferably comprises wireless communication subsystem 101. Wireless communication subsystem 101 allows wireless device 100 to perform wireless communications. Wireless communication subsystem 101 may include the various electronics and components for wireless communication such as a transceiver, modulator/demodulator, antenna, and/or the like (not shown). Wireless communication subsystem 101 may implement any number of wireless communication protocols including, but not limited to, TDM/TDMA, CDMA, global system for mobile communications (GSM), Mobitex packet-switching, Cellular Digital Packet Data (CDPD), the Institute of Electrical and Electronics Engineers (IEEE) 802.11b wireless LAN standard, the Bluetooth standard, and/or the like. However, it shall be appreciated that the present invention is not limited to a particular wireless communication protocol. Embodiments of the present invention may be practiced utilizing any suitable communication protocol to allow remote access to a uniquely-identified device.

Wireless device 100 comprises processor 102. Processor 102 operates under the control of executable instructions or code. Processor 102 may be implemented utilizing, for example, STRONGARM processor, a RISC processor, and/or the like. It shall be appreciated that the present invention is not limited to the architecture of processor 102. Any suitable processor 102 may be utilized as long as processor 102 supports the inventive operations as described herein.

Wireless device 100 may further comprise operating system 103. Operating system 103 may be installed on non-volatile memory 106. Non-volatile memory 106 may be implemented utilizing flash memory (PROM, EPROM, EEPROM, or the like), a memory card, a hard disk, and/or the like. Operating system 103 or a portion thereof (if a dynamically-loadable kernel is utilized) may be loaded into random access memory (RAM) 108 during boot procedures. Operating system 103 may manage all other programs or applications executing on wireless device 100. Operating system 103 may perform process management, manage internal memory, control input/output (I/O) operations, and/or the like.

Operating system 103 preferably comprises security protocol 110. Security protocol 110 may be remotely invoked when wireless device 100 receives an appropriate security initialization message. The operations of security protocol 110 will be discussed in greater detail with respect to FIG. 5.

Additionally, operating system 103 may provide lower-level functionality that may be accessed by other programs or applications. For example, operating system 103 may comprise protected kernel 104 according to a preferred embodiment. Protected kernel 104 prevents modification of the operating system 103 by preventing modification of kernel routines, kernel routine tables, and/or the like. By utilizing protected kernel 104, wireless device 100 minimizes the probability that the security protocols of embodiments of the present invention will be circumvented by a malicious user. Programs may access protected kernel 104 by performing system calls, by calling an application program interface (API), and/or the like. For example, programs may perform a system call to access files. Similarly, programs may perform a system call to establish a transmission control protocol/Internet protocol (TCP/IP) connection utilizing wireless communication subsystem 101.

Wireless device 100 may include basic input/output system (BIOS) 105. BIOS 105 is built-in software that determines the lowest level functionality of wireless device 100. BIOS 105 is typically stored in flash memory such as PROM, EPROM, EEPROM, and/or the like. BIOS 105 may comprise the code to control the keyboard, display screen, disk drives, serial communications, and a number of miscellaneous functions. BIOS 105 may also comprise code to define the boot-up operations of wireless device 100. BIOS 105 may comprise code to load operating system 103 or a portion thereof into RAM 108 and code to transfer processing control to operating system 103. BIOS 105 may also comprise code that verifies that operating system 103 or a portion thereof has not been modified by, for example, utilizing a check-sum calculation. In particular, BIOS 105 may preferably verify the integrity of security protocol 110, i.e., determining whether code associated with security protocol 110 and lock-up functionality of operating system 103 has been modified as a condition to booting wireless device 100. Additionally, BIOS 105 may verify, by utilizing state information stored in non-volatile memory 106, that wireless device 100 is not subject to unauthorized use as a condition to booting. If wireless device 100 is subject to unauthorized use, BIOS 105 may boot wireless device 100 in a protected mode that prevents access to user applications 107 and user data.

Wireless device 100 may further comprise user applications 107. User applications 107 may be stored on non-volatile memory 106 and loaded into RAM 108 when initialized by a user. User applications 107 may include code for a scheduling program, a personal contacts program, a word processing program, a spreadsheet program, a browser program, audio content presentation program, a digital image viewing program, and/or the like. User applications 107 may interact with a user via user interface 109. User interface 109 may be implemented as a touchable screen. User applications 107 may store pertinent user data in non-volatile memory 106.

Figure 2:
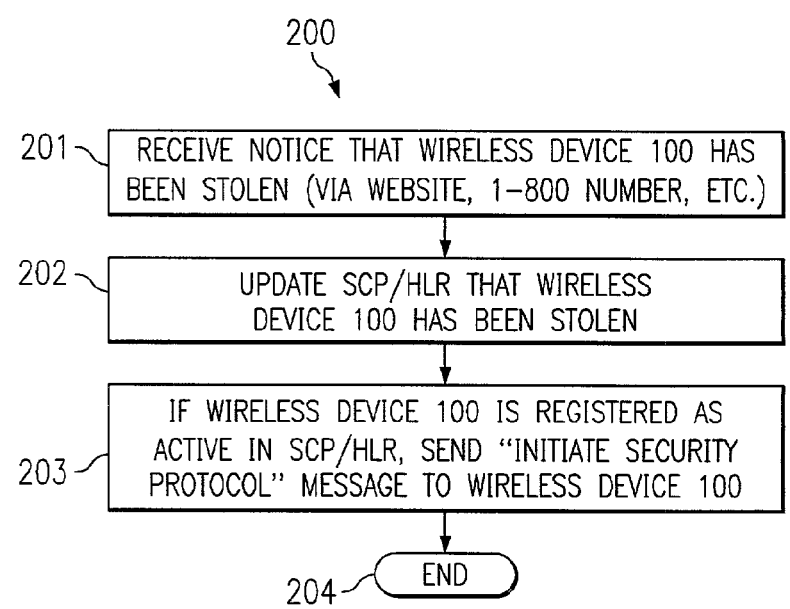
FIG. 2 depicts an exemplary flowchart of steps that initiate a security protocol according to embodiments of the present invention.

FIG. 2 depicts exemplary flowchart 200 to illustrate how a security protocol may be initiated according to embodiments of the present invention. In step 201, notice is received that wireless device 100 is not in possession of a rightful user. The rightful user may be any individual who may utilize wireless device 100 in an authorized manner. The rightful user may be the owner, a lessee, someone who has temporarily borrowed the device, and/or the like. The rightful owner may provide the notice when the wireless device 100 is lost, misplaced, stolen, unreturned, or is otherwise subject to unauthorized use. For example, a website may be utilized that would allow the owner of wireless device 100 to enter an appropriate password or code and an identifier associated with wireless device 100. Alternatively, the notice may be received via a toll-free number by an automated system or by a customer service representative.

In step 202, the service control point/home location registry (SCP/HLR) or other database is updated to indicate the wireless device 100 is lost, misplaced, unreturned, stolen, or is otherwise potentially subject to unauthorized use. The notice may be received from a user of wireless device 100. Alternatively, the notice may be autonomously generated. For example, a user may attempt to access a resource (internal or external to wireless device 100) utilizing wireless device 100 that requires a password before access is granted. If the user submits an erroneous password several times, it may be inferred that the user should not be granted access to wireless device 100. Accordingly, the notice may be generated by the resource associated with the password requirement.

In step 203, an "INITIATE SECURITY PROTOCOL" message is sent to wireless device 100 to stop the use of wireless device 100, if wireless device 100 is registered as active in the database of the SCP/HLR. If wireless device 100 is not registered as active, communication cannot occur and the SCP/HLP preferably does not attempt to communicate at that time. In step 204, the process flow ends.

If the wireless device 100 was not registered as active when the notice is received, wireless communication with wireless device 100 is not possible. Accordingly, the initiation of the security protocol is deferred until a later time. FIG. 3 depicts exemplary flowchart 300 for initiation of the security protocol at a later time. Flowchart 300 assumes that the user has already communicated that wireless device 100 is stolen or is subject to unauthorized use and that the SCP/HLR or another suitable database has been appropriately updated.

In step 301 of flowchart 300, wireless device 100 is powered-on. At this point, wireless device 100 commences the usual boot-up procedures, e.g., initializing RAM 108, testing various components, loading operating system 103, and/or the like. Additionally, wireless device 100 attempts to register with a local network by communicating its MIN, ESN, etc. (step 302). The local network forwards the received information to SCP/HLR (step 303). SCP/HLR performs a database look-up operation and determines that wireless device 100 is stolen or subject to unauthorized use (step 304). SCP/HLR sends the "INITIATE SECURITY PROTOCOL" message to wireless device 100 via the local network (step 305). In step 306, the process flow ends.

Although embodiments of the present invention are operable to initiate security protocol 110 utilizing messaging protocols associated with public cellular networks, the present invention is not limited to such protocols. For example, the wireless communication may occur via a private wireless communication network (e.g., IEEE 802.11b or Bluetooth network) that do not implement validation algorithms via an SCP/HLR.

Accordingly, FIG. 4 depicts exemplary flowchart 400 to illustrate initialization of security protocol 110 without relying on a ESN/MIN protocol to identify wireless device 100. In step 401, wireless device 100 detects a wireless network access point. Wireless device 100 enters the wireless network according to the appropriate wireless communication protocol (step 402). In step 403, wireless device 100 obtains an Internet Protocol (IP) address from a dynamic host configuration protocol (DHCP) server associated with the wireless network to communicate via the Internet. In step 404, wireless device 100 automatically registers with a database (e.g., a web server) that determines whether wireless device 100 is lost, misplaced, unreturned, stolen, or otherwise is subject to potential unauthorized use. The registration message communicates the IP address of wireless device 100 to the database. Additionally, the registration message may communicate a unique identifier (e.g., media access control (MAC) identifier) associated with wireless device 100. In step 405, assuming that wireless device 100 is lost, misplaced, unreturned, stolen, or otherwise is subject to potential unauthorized use, wireless device 100 receives the "INITIATE SECURITY PROTOCOL" message from the database. In step 406, the process flow ends.

FIG. 5 depicts exemplary flowchart 500 to illustrate steps that implement security protocol 110 according to embodiments of the present invention. Flowchart 500 begins at step 501 with wireless device 100 receiving the "INITIATE SECURITY PROTOCOL" message (see step 203 of FIG. 2, step 305 of FIG. 3, and step 405 of FIG. 4). The message is identified in the incoming wireless data received via wireless communication subsystem 101. In step 502, operating system 103 invokes security protocol 110 in response to the "INITIATE SECURITY PROTOCOL" message.

In step 503, security protocol 110 preferably writes a "STOLEN" status in non-volatile memory 106. The status is written in non-volatile memory 106 so that an unauthorized user cannot simply reset wireless device 100 to circumvent the security mechanisms. Specifically, when wireless device 100 is reset, BIOS 105 will execute. BIOS 105 may access non-volatile memory 106 and verify the status of wireless device 100. If non-volatile memory 106 indicates that the device is lost, misplaced, unreturned, stolen, or otherwise subject to unauthorized use, BIOS 105 will boot operating system 103 in a protected mode that prevents an unauthorized user from accessing user data or initiating user applications 107. Alternatively, BIOS 105 may simply cease operations without booting wireless device 100.

In step 504, security protocol 110 preferably causes user applications 107 to exit by, for example, executing an appropriate process management API call associated with operating system 103. In step 505, security protocol 110 preferably locks user data to prevent access to the user data, by, for example, associating a password with user data files. In step 506, security protocol 110 displays an appropriate message on user interface 109. For example, security protocol 110 may display "DEVICE IS LOST OR STOLEN—PLEASE CALL 1-800-XXX-XXXX." If the device is only lost and is found by a conscientious individual, the individual may call the 1-800 number to allow the return of wireless device 100 to its owner through an appropriate intermediary.

If wireless device 100 is rebooted or reset after execution of security protocol 110, operating system 103 will not allow execution of user applications 107 or access to user data as previously noted. However, it is preferred to allow wireless device 100 to perform some minimal functions. For example, operating system 103 preferably displays the appropriate message on user interface 109. Additionally, operating system 103 may allow presentation of a prompt to allow the rightful owner to enter an appropriate password to restore operations of wireless device 100. Moreover, by allowing some operations, wireless device 100 may perform minimal wireless communications. It may be desirable to allow wireless device 100 to autonomously perform wireless communications to allow wireless device 100 to be located by appropriate authorities.

Embodiments of the present invention provide several advantages. First, embodiments of the present invention do not merely block access of a wireless-capable device to wireless networks. Instead, embodiments of the present invention prevent an unauthorized user from utilizing other valuable functionality of a wireless device such as execution of user applications. Additionally, embodiments of the present invention prevent an unauthorized user from circumventing the security features. Specifically, the status of wireless device 100 is preferably maintained in non-volatile memory 106. Accordingly, the status information may be utilized by BIOS 105 and operating system 103 after each boot process to limit the operations of wireless device 100. Moreover, operating system 103 and BIOS 105 are preferably implemented to prevent modification of executable instructions to bypass the security features.

The invention claimed is:

1. A processor-based device that prevents unauthorized use, comprising:
   a processor for executing software instructions;
   software instructions defining at least one user application;
   a wireless communication subsystem that is operable to transmit and receive data utilizing a wireless protocol;
   software instructions defining a security protocol process that is operable to prevent execution of said software instructions defining said at least one user application by said processor when a message is received via said wireless communication subsystem, wherein said message indicates that said processor-based device is not in possession of a rightful user; and a basic input/output system (BIOS) that is operable to boot said processor-based device and is further operable to verify integrity of said security protocol process before completing boot operations.

2. The processor-based device of claim 1 further comprising:
non-volatile memory, wherein said security protocol process is operable to store information in said non-volatile memory to indicate that execution of said software instructions defining at least one user application is not permitted.

3. The processor-based device of claim 2 wherein said non-volatile memory is flash memory.

4. The processor-based device of claim 1 further comprising:
user data, wherein said security protocol process is operable to prevent access to said user data when said message is received.

5. The processor-based device of claim 1 wherein said security protocol process is operable to cause said at least one user application to exit if said at least one user application is executing when said message is received.

6. The processor-based device of claim 1 further comprising:
a display, wherein said security protocol process causes said display to present information indicating that said rightful user is not in possession of said processor-based device.

7. The processor-based device of claim 1 wherein said security protocol process is implemented in an operating system of the processor-based device.

8. A method for protecting a processor-based device from unauthorized use, wherein said processor-based device performs wireless communication, said method comprising:
receiving notice that said processor-based device is not in possession of a rightful user;
sending a message to said processor-based device to initiate a security protocol via a wireless communication protocol;
receiving said message by said processor-based device; and
initiating said security protocol on said processor-based device in response to said received message, wherein said initiating comprises preventing execution by said processor-based device of at least one user application that is defined by software instructions stored on said processor-based device in response to receiving said message by said processor-based device, wherein said preventing execution is implemented by an operating system of said processor-based device; and writing information in non-volatile memory of said processor-based device that said processor-based device is not in possession of said rightful user in response to said received message.

9. The method of claim 8 wherein said non-volatile memory is flash memory.

10. The method of claim 8 further comprising:
preventing access to user data stored on said processor-based device in response to said received message.

11. The method of claim 8 further comprising:
displaying a message on a display of said processor-based device to indicate that said processor-based device is not in possession of said rightful user.

12. The method of claim 8 further comprising:
causing at least one user application to exit if said at least one user application is executing when said message is received by said processor-based device.

13. The method of claim 8 further comprising:
verifying integrity of executable code that implements said security protocol.

14. A system that prevents unauthorized use, comprising:
means for processing software instructions;
means for defining at least one user application;
means for transmitting and receiving data utilizing a wireless communication protocol; and
means for preventing execution of said software instructions defining said at least one user application by said means for processing when a message is received via said means for transmitting and receiving, wherein said message indicates that said system is not in possession of a rightful user, wherein said means for preventing execution is implemented by an operating system of said system.

15. The system of claim 14 further comprising:
means for preventing access to user data that is operable when said message is received.

16. The system of claim 14 further comprising:
means for storing information in non-volatile memory to indicate that said system is not in possession of said rightful user.

17. The system of claim 14 further comprising:
means for displaying information to indicate that said rightful user is not in possession of said system.

* * * * *